United States Patent
Cho et al.

(10) Patent No.: US 9,880,290 B2
(45) Date of Patent: *Jan. 30, 2018

(54) METHOD OF MEASURING RADIOACTIVE MATERIAL OF INGOT USING HPGE GAMMA SCINTILLATOR

(71) Applicant: KEPCO NUCLEAR FUEL CO., LTD., Daejeon (KR)

(72) Inventors: Suk Ju Cho, Daejeon (KR); Young Bae Lee, Daejeon (KR); Jeung Gun Seol, Daejeon (KR); Yong Jae Kim, Daejeon (KR); Jae Bong Ryu, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 1418 days.

This patent is subject to a terminal disclaimer.

(21) Appl. No.: 13/873,340

(22) Filed: Apr. 30, 2013

(65) Prior Publication Data

US 2013/0297229 A1    Nov. 7, 2013

(30) Foreign Application Priority Data

May 3, 2012  (KR) .................. 10-2012-0046978

(51) Int. Cl.
*G01N 31/00* (2006.01)
*G01T 1/167* (2006.01)

(52) U.S. Cl.
CPC .................... *G01T 1/167* (2013.01)

(58) Field of Classification Search
CPC .................................................. G01T 1/167

USPC .......................................................... 702/30
See application file for complete search history.

(56) References Cited

U.S. PATENT DOCUMENTS 4,857,729 A * 8/1989 Gadeken ............. E21B 47/1015
                                                                  250/256

FOREIGN PATENT DOCUMENTS

| JP | 05-340861 A | 12/1993 |
| KR | 10-1016223 B1 | 2/2011 |
| KR | 10-2011-0091264 A | 8/2011 |

OTHER PUBLICATIONS

Ei-Gammal, "Verification of 235U mass content in nuclear fuel plates by an absolute method" (2006).*
Anilkumar et al., "Estimation of 235U concentration in some depleted uranium samples by high resolution gamma-ray spectrometry using 185keV and 1001keV gamma-energies of 235U and 234mPa" (2007).*

(Continued)

*Primary Examiner* — Stephanie Bloss
(74) *Attorney, Agent, or Firm* — Rabin & Berdo, P.C.

(57) ABSTRACT

Disclosed is a method of measuring radioactive material of an ingot, in which an ingot having a volume produced by subjecting metal waste generated in nuclear fuel processing or production facilities to melting decontamination undergoes gamma spectroscopy using a HPGe detector to measure gamma rays of U-235 (185.72 keV, 57.2%) among uranium isotopes, followed by performing detector calibration using a certified reference material and self-absorption correction depending on the density of a medium using MCNP computer code, and which enables rapid determination of whether the ingot subjected to melting decontamination may be self-disposed of or not.

7 Claims, 7 Drawing Sheets

(56) References Cited

OTHER PUBLICATIONS

Schlienger et al., "Melt Processing of Radioactive Waste: A Technical Overview" (1997).*
MNCP Trademark registration.*
Rich et al., "Health Physics Manual of Good Practices for Uranium Facilities" (1988).*
Ki Hoon Yoon et al., "Analysis of uranium isotopes contained in the analyzed sample using HPGe $\gamma$-Spectrometry", 2009 Spring Research Meeting Collected Papers, Korean Association for Radiation Protection, pp. 128-129.

* cited by examiner

METHOD OF MEASURING RADIOACTIVE MATERIAL OF INGOT USING HPGE GAMMA SCINTILLATOR

BACKGROUND OF THE INVENTION

1. Field of the Invention

The present invention relates to a method of measuring the radioactive material of an ingot using a HPGe gamma scintillator, and more particularly, to a method of measuring the radioactive material of an ingot, in which an ingot having a volume produced by subjecting metal waste generated in nuclear fuel processing or production facilities to melting decontamination undergoes gamma spectroscopy using a HPGe gamma scintillator, thus rapidly and efficiently measuring radioactivity of the radioactive material of the ingot.

2. Description of the Related Art

Industrial waste composed mainly of iron metals such as stainless steel and carbon steel is treated as a very important resource, and the rate of recycling thereof is considerably higher than other waste.

Typically, recycling of waste aims to resolve the shortage of natural resources and problems caused by air, water and soil contamination due to waste. However, in the case of metal, because the cost required to recycle resources or waste which has been re-treated is much smaller than the production cost of products using new natural resources, disposal of generated metal waste without recycling is regarded as a big loss in terms of environmental protection and economic benefits.

Also metal waste generated in nuclear facilities may be reproduced using a recycling process like other industrial metal waste. However, there is a potential for such metal waste to be radioactive because of artificial neutron irradiation or for the surface or volume thereof to have been contaminated by the radioactive materials used in nuclear facilities. Hence, when this waste is discharged to the market without appropriate restrictions, the public may be indiscriminately exposed depending on the recycling of contaminated metals. Accordingly, all metal waste generated in the radiation controlled zones of nuclear facilities is considered to be subject to restrictions in principle. However, if the same restriction rule is applied to the case where radiological effects on the public and the environment are considerably small because the concentration of radionuclides in metal waste is very small, the economic and social costs may be unnecessarily increased. In accordance with domestic nuclear-relevant act, only in the case where the concentration of radionuclides of metal waste is below a predetermined level (a clearance level), namely where radiological effects on the public and the environment due to the recycling of metal waste are not more than a clearance limit defined by the nuclear-relevant act, is the waste deregulated so as to be disposed of (recycled). The related radiation safety management and radiological risk assessment are an absolute requirement of regulatory agencies, thus minimizing radiological effects on the public and the environment resulting from clearance.

Because metal waste such as filter frames, powder drums for natural uranium, nuts, bolts and metal scrap generated in nuclear fuel processing and production facilities are expected to be contaminated with uranium compounds such as $UO_2$, $UO_2F_2$ or $U_3O_8$, these are regarded as radioactive waste and have to be regulated. However, the case where the concentration of the radioactive contaminant in the waste is not more than a clearance limit as mentioned above is deregulated, making it possible to carry out clearance via recycling.

Meanwhile, metal waste which is of the flat panel type and has a geometrical shape that is comparatively simple and which has a smooth surface or which has shapes similar thereto may be recycled using only surface decontamination. The real-time determination of radioactivity after a decontamination process is possible using both direct measurement using a surface contamination meter that is used in nuclear fuel processing plants and indirect measurement using smear. Thus, the surface contamination of metal waste having complicated geometrical shapes such as nuts or bolts cannot be subjected to direct measurement and smear measurement is also not easy, making it very difficult to decontaminate such metal waste and measure the radioactivity thereof.

In the case where metal waste having a complicated structure is heated to high temperature and melted, because the radioactive material in metal is uniformly distributed in the medium and the nuclear fuel material which is a contaminant of the melt moves into the slag, metal waste on which it is difficult to perform surface decontamination and direct measurement may be subjected to melting decontamination so that the volume thereof is reduced and uranium materials are removed from the metal medium, making it possible to carry out clearance.

Thorough research into melting decontamination techniques of metal waste containing radioactive materials is ongoing both within and outside the country. Particularly in the case where contaminants are nuclear fuel (uranium nuclides), most radioactive contaminants are reported to move into the slag upon melting. Although the decontamination effects thereof may vary depending on initial contamination conditions and operating conditions including the melting additive used, the type of melting furnace, etc., the amount of uranium moving into the slag upon melting decontamination of the metal is at least 1000 times the amount of uranium that moves to ingots. This trend is reported to increase as the initial contamination becomes higher.

For example, Korean Patent No. 10-1016223 discloses a melting decontamination system of radioactive metal scrap, in which radioactive metal waste generated in nuclear facilities, containing U-238, Ce-144, Cs-134, Cs-137, Sr-89, Sr-90, Ni-63, Co-58, Co-60, Cr-51, etc. as nuclides to be decontaminated, are subjected to melting decontamination, so that decontaminated ingots are separated from radioactive slag, and the decontaminated ingots are recycled and the radioactive slag is treated as radioactive waste.

However to perform clearance of the ingots produced using melting decontamination, radioactivity of the ingots should be proven to be less than the disposal limit defined by nuclear-relevant act. To this end, measurement of the radioactivity of the ingots must be reliable.

Prior to melting decontamination, metals have surface contamination characteristics, whereas ingots produced using melting decontamination have volume contamination characteristics. Uranium nuclides which are radioactive contaminants are alpha emitters, so that alpha rays emitted upon the decay of uranium react with the medium and are mostly self-absorbed. Thus conventional radioactivity analysis methods using alpha nuclide surface contamination measurement may not be effective at analyzing the radioactivity of ingots.

Therefore the present invention is intended to provide a method of rapidly and efficiently measuring the radioactive material of an ingot having a volume resulting from melting decontamination of metal waste generated in nuclear fuel processing or production facilities, in order to enable clearance of the ingot.

SUMMARY OF THE INVENTION

Accordingly, the present invention has been made keeping in mind the above problems encountered in the related art, and an object of the present invention is to provide a method of rapidly and efficiently measuring the radioactive material of an ingot having a volume using a HPGe detector in order to achieve clearance of the ingot, in which such an ingot may be produced by subjecting metal waste generated in nuclear fuel processing or production facilities to melting decontamination.

In order to accomplish the above object, the present invention provides a method of measuring the radioactive material of an ingot, in which an ingot having a volume produced by subjecting metal waste generated in nuclear fuel processing or production facilities to melting decontamination undergoes gamma spectroscopy using a high purity germanium (HPGe) detector to measure gamma rays of U-235 (185.72 keV, 57.2%) among uranium isotopes, followed by performing detector calibration using a certified reference material (CRM) and self-absorption correction depending on the density of a medium using MCNP (Monte Carlo N-Particle) computer code, and calculating total radioactivity of the ingot from quantified radioactivity and mass of U-235.

Preferably in the present invention, U-235 has an enrichment of 0.711 w/o~5 w/o, and more preferably the enrichment of U-235 is determined depending on a source of the generated metal waste. Preferably, the radioactivity and mass of U-235 are quantified using a detection value of U-235, and radioactivity of total uranium is obtained from the following equation depending on the enrichment of U-235.

$$S.A \ (Ci/g) = (0.4 + 0.38 E_{235} + 0.0034 E_{235}^2) \times 10^{-6} \quad \text{[Equation]}$$

In the above equation, S.A is a specific activity of total uranium using the enrichment ($E_{235}$) of U-235.

Preferably in the present invention, an effective live time of the ingot using the HPGe detector is 9,000~11,000 sec. Preferably in the present invention, the ingot has a thickness of 1~10 cm.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, embodiments of the present invention will be described in detail with reference to the appended drawings.

Typically the surface of metal waste generated in nuclear fuel processing or production facilities may be contaminated by a very small amount of nuclear fuel material due to dust or the like generated during the processing of nuclear fuel. Thus, the nuclear fuel material generated in nuclear fuel processing or production facilities is provided in the chemical form of $UO_2$, $U_3O_8$, etc., having an enrichment from 0.711 w/o (natural uranium) to 5 w/o, and exists in a particulate phase.

Radiation sources included in uranium ores used upon production of nuclear fuel may include not only uranium isotopes for example, U-238, U-235, U-234 and the like, but also daughter nuclides, fission products, transuranic radionuclides, etc. resulting from decay of the uranium isotopes. However, radionuclides other than the uranium isotopes are removed via a series of uranium refining, transformation and re-transformation to manufacture nuclear fuel. Also, the daughter nuclides of uranium resulting from radioactive decay to create a nuclear fuel assembly exist in a very small amount which is difficult to analyze, taking into consideration the nuclear fuel processing time and the like, and furthermore the metal waste is refined again via melting decontamination and thus the contaminants of the ingots produced from the metal waste may also be limited to uranium isotopes, such as U-234, U-235 and U-238, and daughter nuclides such as Th-234 and the like which achieve radioactive equilibrium within a short time.

Also, unlike nuclear power plants, in nuclear fuel processing facilities, the probability of radioactive metals being formed due to neutron irradiation is very low, and thus there is no potential for radioactive metal waste to be created.

Meanwhile, uranium isotopes U-234, U-235 and U-238 emit gamma rays via alpha decay. U-235 emits gamma rays of 185.72 keV at high rate (57.2%) and thus gamma rays may be directly measured and the radioactivity may be calculated, whereas it is not easy to directly determine U-234 and U-238. For example, directly determining U-234 and U-238 may be carried out using secular equilibrium with uranium's daughter nuclides in nature, but is problematic because a considerably long period of time is required to achieve secular equilibrium. Particularly metal waste generated in nuclear fuel processing or production facilities includes enriched uranium which is present in a state in which uranium and its daughter nuclides have unbalanced concentrations, making it impossible to calculate radioactivity of U-234 or U-238 via measurement of gamma rays of daughter nuclides.

Thus in the present invention, an ingot having a volume resulting from melting decontamination of metal waste generated in nuclear fuel processing or production facilities undergoes gamma spectroscopy using a high purity germanium gamma scintillator (which is referred to as "HPGe gamma scintillator") as a detector to measure gamma rays of U-235 (185.7 keV, 57.2%) among uranium isotopes, followed by performing detector calibration using a certified reference material (CRM) and self-absorption correction depending on the density of a medium using MCNP computer code thus obtaining a uranium concentration from which the radioactive material of the ingot is then measured.

In the present invention, the HPGe gamma scintillator is used to detect gamma rays emitted from a radioactive sample, and is provided with a cryostat for maintaining low temperature using liquid nitrogen, a high-voltage generator, a preamplifier, a multichannel analyzer (MCA), a computer having an analysis program, etc., and has high energy resolution, thereby achieving analysis of nuclides for emitting gamma rays and radioactivity.

In the present invention, the ingot is produced from metal waste using melting decontamination and molding, and has a thickness which is not effective at typically measuring radioactivity using alpha spectroscopy, preferably a thickness of about 1 cm or more.

Particularly in the present invention, the radioactivity of total uranium is determined by using only U-235 (185.72 keV, 57.2%) as a direct measurement value, and by an equation in which the specific activity of total uranium may be determined using the enrichment of U-235 depending on the source of the generated metal waste based on analytic results of measured U-235.

In the method of measuring the radioactive material according to the present invention, an effective live time of the ingot may fall in the range of 9,000~11,000 sec using a HPGe gamma scintillator, thus rapidly and efficiently determining whether clearance of the ingot subjected to melting decontamination is possible.

U-235 emits gamma rays of 185.7 keV at a high rate of 57.2% upon decay, making it possible to directly measure U-235. As such, gamma rays emitted from U-235 measured in this range are interfered with by gamma rays of 186.2 keV (3.59%) emitted from Ra-226 in nature.

$$C(186)=C(^{235}U,185.7)+C(^{226}Ra,186.21)$$

Specifically, in order to calculate the radioactivity of U-235 based on the count rate in the energy range of 185~186 keV, the count rate measured by decay of Ra-226 in the same energy range should be corrected. Because Ra-226 which exists in nature is in a state of secular equilibrium with its daughter nuclides Pb-214 and Bi-214, the gamma rays of Pb-214 and Bi-214 are measured to calculate the count rate of gamma rays emitted by decay of Ra-226. In the case where a daughter nuclide of Ra-226, that is, Rn-222 which is present in a gas phase, is allowed to stand open to the air, it may diffuse in air. Hence, Rn-222 must be stored sealed for a period of time (about one month) sufficiently longer than its half life of 3.82 days so as to prevent it from being emitted into the air.

The relationship between the count rate of gamma rays of 295.2 keV emitted from Pb-214 and the count rate of gamma rays of 186.21 keV emitted from Ra-226 is represented by the following Equation 1.

$$C(^{226}Ra, 186.21) = \frac{\varepsilon(186.21) \times I(^{226}Ra, 186.21)}{\varepsilon(295.2) \times I(^{214}Pb, 295.2)} \times C(^{214}Pb, 295.2)$$ [Equation 1]

Pb-214 also emits gamma rays of 351.9 keV, and cross validation may be conducted using the same. The count number of gamma rays emitted from Pb-214 may be interfered with by gamma rays of 351.06 keV emitted from Bi-214. Although the count number of gamma rays of 351.9 keV emitted from Pb-214 may be interfered with by gamma rays of 351.06 keV emitted from Bi-214, Bi-214 and Pb-214 are in secular equilibrium as mentioned above, thereby making it possible to determine the radioactivity of each nuclide.

$$C(^{226}Ra, 186.21) = \frac{\varepsilon(186.21) \times I(^{226}Ra, 186.21)}{\varepsilon(295.2) \times I(^{214}Pb, 295.2)} \times \frac{C(351)}{1 + \frac{\varepsilon(351.06) \times I(^{214}Bi, 351.06)}{\varepsilon(351.9) \times I(^{214}Pb, 351.9)}}$$

Typically because Ra-226 and U-238 have the same radioactivity in nature in which a mother nuclide and a daughter nuclide are in secular equilibrium, it is possible to calculate effects of gamma rays of 186.21 keV of Ra-226 with the radioactivity of U-238 in nature. In the case of a natural sample containing naturally enriched uranium, 57.6% of the area of the peak of the energy range of 185~187 keV is caused by Ra-226. Thus the case where the sample containing natural radioactive nuclides such as concrete is contaminated by a nuclear fuel material needs correction to calculate uranium radioactivity.

However, in the case of metal waste, because the medium itself does not contain nuclides present in nature, Ra-226 or the like creates no interference. When the sample is contaminated with artificially enriched nuclear fuel, the count number of gamma rays of U-235 may be overestimated because of the gamma rays of Ra-226 formed by decay from U-238. However, millions of years are required until the amount of gamma rays emitted from Ra-226 produced from artificially contaminated U-238 has an influence on the quantification of U-235, and thus, the effects of Ra-226 resulting from artificial uranium contamination in nuclear fuel plants may be ignored.

The nuclear fuel material handled in nuclear fuel processing or production facilities includes only uranium isotopes, in which the uranium enrichment falls in the range of 0.711 w/o (natural uranium)~5.0 w/o. Because the nuclear fuel used is processed differently depending on its enrichment in a manner similar to that used to process fuel for a heavy water reactor, which is manufactured separately from fuel for a light water reactor, it is possible to determine the enrichment of the nuclear fuel contaminant depending on the source of the generated metal waste and also to estimate the activity ratio and the abundance ratio of U-238 and U-234 by quantification of only U-235, as given in Table 1 below.

TABLE 1

Abundance Ratio and Activity Ratio of Uranium Isotopes depending on Enrichment of U-235

| Nuclide | Nature | | 2.0 w/o | | 3.5 w/o | | 4.5 w/o | |
|---|---|---|---|---|---|---|---|---|
| | Abundance Ratio | Activity Ratio | Abundance Ratio | Activity Ratio | Abundance Ratio | Activity Ratio | Abundance Ratio | Activity Ratio |
| U-234 | 0.00005 | 0.48700 | 0.00016 | 0.73500 | 0.00030 | 0.82300 | 0.00039 | 0.85625 |
| U-235 | 0.00711 | 0.02300 | 0.02000 | 0.03043 | 0.03500 | 0.03400 | 0.04500 | 0.03319 |
| U-238 | 0.99284 | 0.49000 | 0.97984 | 0.23400 | 0.96470 | 0.14400 | 0.95461 | 0.11055 |

Figure 1:
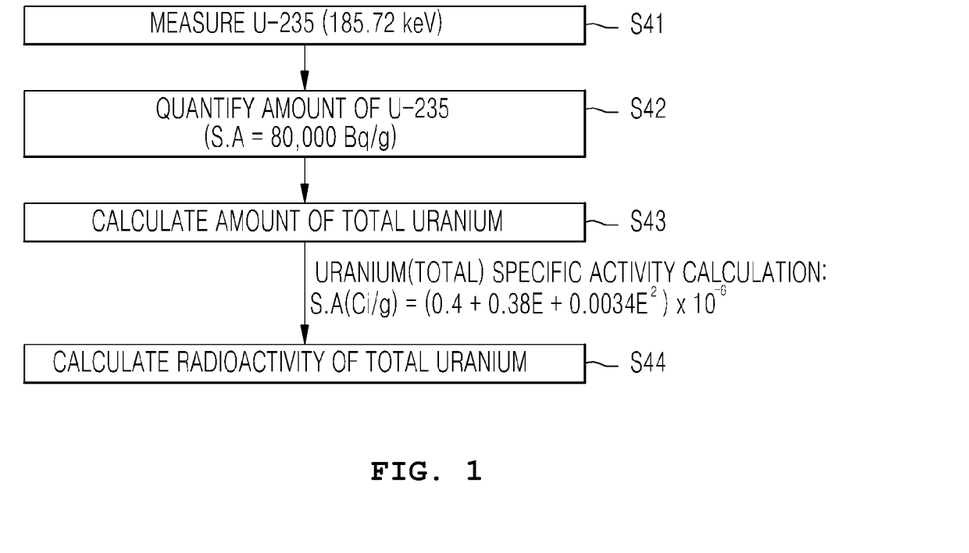
FIG. 1 is a flowchart schematically illustrating a procedure of determining the radioactivity of total uranium, in a process of measuring the radioactive material of an ingot using a HPGe gamma scintillator according to the present invention.
Figure 2:
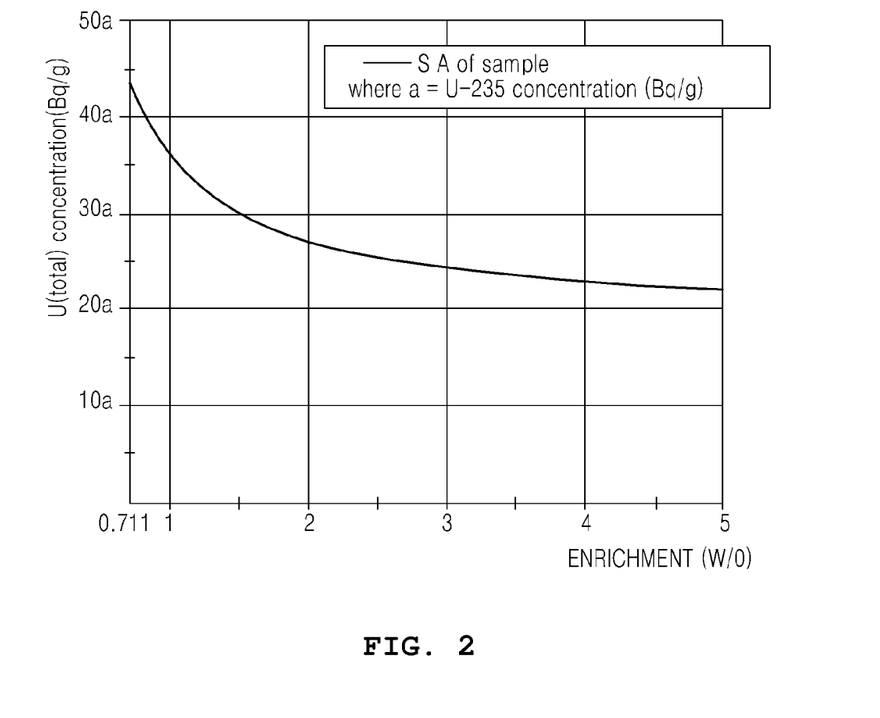
FIG. 2 is a graph illustrating the uranium radioactivity depending on the enrichment in the process of measuring the radioactive material according to the present invention.

FIG. 1 schematically shows the procedure of calculating the radioactivity of total uranium via detection of U-235 (185.72 keV, 57.2%) according to the method of the invention, in which the radioactivity and mass of U-235 are quantified from the detection value of U-235, and the total uranium weight may be calculated using the abundance ratio of Table 1 from the enrichment of U-235, and also the radioactivity of total uranium may be obtained from Equation 2 below (For reference, FIG. 2 is a graph illustrating the specific activity of uranium depending on the enrichment of U-235).

$$S.A\ (Ci/g) = (0.4 + 0.38 E_{235} + 0.0034 E_{235}^2) \times 10^{-6} \qquad \text{[Equation 2]}$$

In Equation 2, S.A is the specific activity of total uranium using the enrichment ($E_{235}$) of U-235.

For example, when U-235 is measured to be 1 Bq, the specific activity of U-235 is $8.00 \times 10^4$ Bq/g, and the corresponding weight is $1.25 \times 10^{-5}$ g. When the enrichment is 2.0 w/o, the total uranium weight may be determined to be $6.254 \times 10^{-4}$ g as seen in Table 1, and thus the total radioactivity may be calculated to be 27.14 Bq from the specific activity of total uranium obtained using the enrichment (2 w/o) of U-235 in Equation 2.

Table 2 below shows the radioactivity of uranium depending on the enrichment of representative U-235.

TABLE 2

Uranium Radioactivity depending on Enrichment

| | Enrichment (w/o) | | | |
|---|---|---|---|---|
| | 0.711 | 2 | 3.5 | 5 |
| Radioactivity (Bq) of Measured U-235 | 1 | 1 | 1 | 1 |
| U-total estimated amount (g) | $1.763 \times 10^{-3}$ | $6.254 \times 10^{-4}$ | $3.574 \times 10^{-4}$ | $2.504 \times 10^{-4}$ |
| U-total radioactivity (Bq) | 43.70 | 27.14 | 23.41 | 22.06 |

When the radioactivity of U-235 is determined in this way, the estimated amount of U-238 increases in proportion to the decrease in the enrichment of uranium, thus increasing the total amount of uranium, resulting in higher total radioactivity.

The concentration of U-235 is quantified via gamma nuclide analysis, after which the enrichment which deduces the most conservative result is applied thus estimating the radioactivity of total uranium.

However, in the case where metal waste generated in the course of manufacturing nuclear fuel for a light water reactor using 4.5 w/o uranium is handled like the metal waste generated during the manufacture of nuclear fuel for a heavy water reactor, the radioactivity obtained as above may be overestimated to the extent of about two times compared to the former. For accurate analysis, metal waste has to be sorted depending on the generation source and then separately analyzed. Although metal waste generated in light water reactors is separately managed from metal waste generated in natural uranium, metal waste having an unclear generation source may be subjected to radioactivity assay using natural enrichment from which the most conservative result is deduced.

—Self-Absorption Correction—

In the present invention, the certified reference material ($H_2O$: $\rho = 1.0$ g/cm$^3$) and the sample (ingot (chipped): $\rho = 0.1 \sim 7.8$ g/cm$^3$) to undergo gamma nuclide analysis depending on the density of a medium are simulated using MCNP (Monte Carlo N-Particle) computer code, and probabilities of the gamma rays generated upon decay of U-235 in the medium reaching the detector are respectively calculated, thus attaining an absorption correction factor for the ingot samples.

Figure 3:
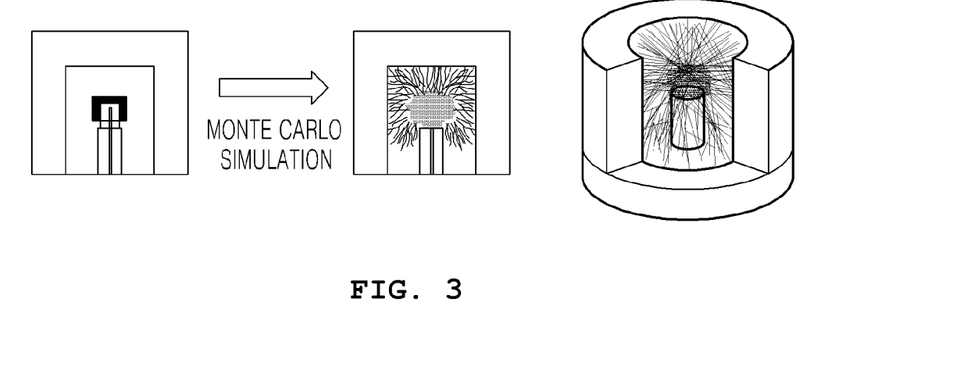
FIG. 3 diagrammatically illustrates results of calculating a self-absorption correction value upon gamma nuclide analysis using MCNP computer code in the process of measuring the radioactive material according to the present invention.

FIG. 3 diagrammatically illustrates the results of calculating the self-absorption correction value depending on the geometry and density of each medium when the energy of gamma rays is 185.72 keV as in the emitted gamma rays upon decay of U-235 using MCNP computer code.

The self-absorption correction coefficient (K) is represented by Equation 3 below.

$$K_{ies} = \frac{M_{ies}}{CRM_{es}} \qquad \text{[Equation 3]}$$

In Equation 3, K is the self-absorption correction coefficient, CRM is the count number of the certified reference material simulated with MCNP, M is the count number of the ingot medium source simulated with MCNP, e is the energy of gamma rays (in this case, 185.72 keV), i is the density of the medium (g/cm$^3$), and s is the form of the certified reference material and the medium.

Figure 4:
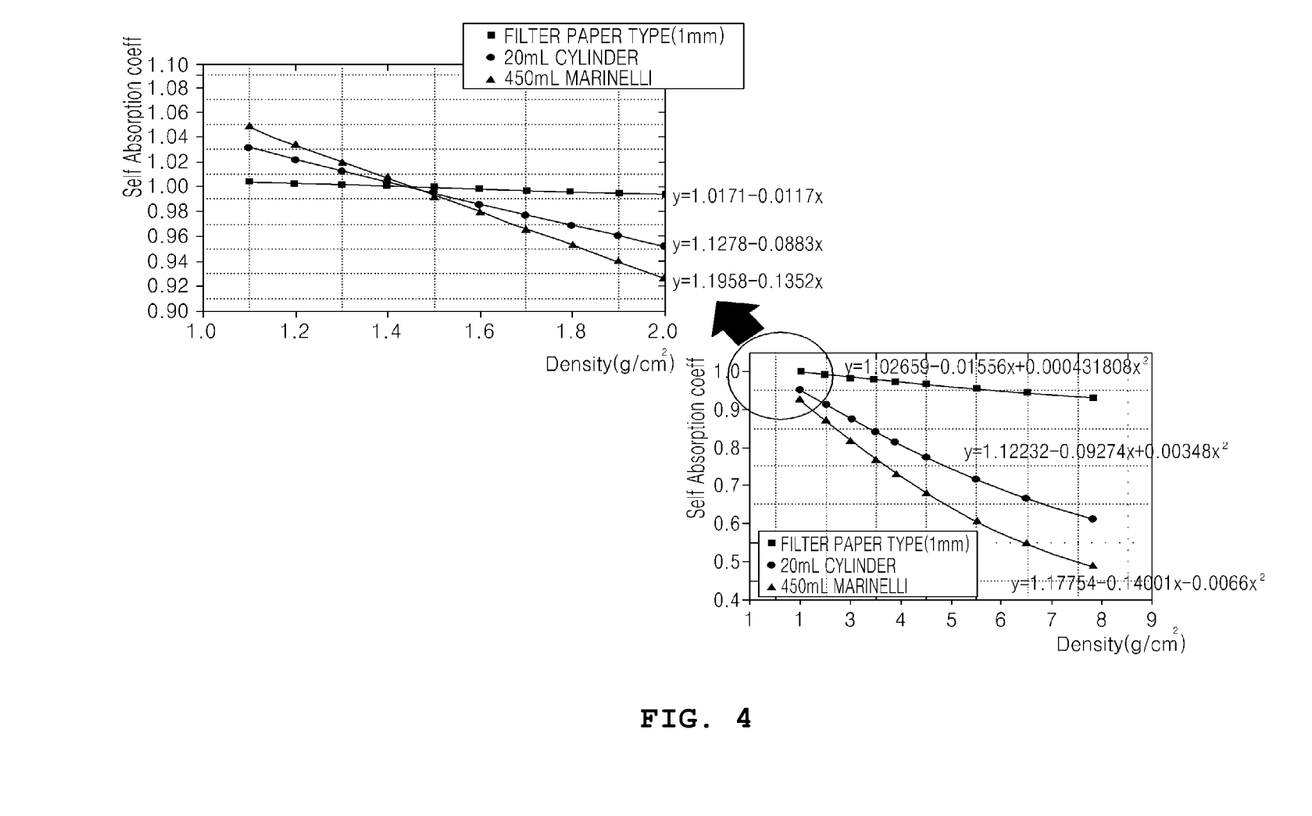
FIG. 4 is of graphs illustrating the self-absorption correction value upon gamma nuclide analysis using MCNP computer code in the process of measuring the radioactive material according to the present invention.

As seen in FIG. 4, the correlation between the self-absorption correction coefficient and the density in the low density range of the medium (1.0~2.0 g/cm$^3$) is different from the correlation between the self-absorption correction coefficient and the density in the high density range (2.0 g/cm$^3$ or more). As such, examples of the source medium include 450 mL Marinelli beaker type (▲), 20 mL cylinder type (●), and 1 mm thick filter paper type (■).

In the low density range, the correlation between the self-absorption correction coefficient and the density is seen to be comparatively linear as in conventional studies, but over the entire density range, the self-absorption correction coefficient decreases exponentially in proportion to the increase in density. This is based on the physical trend according to which as the atomic density in the medium increases, the probability of gamma rays passing through the medium not interacting with the medium decreases exponentially.

Thus in the case where the medium is iron-based metal composed mainly of Fe, the self-absorption coefficient correlation calculated using the MCNP computer code depending on the form and density of each medium is given in Table 3 below.

TABLE 3

Self-Absorption Correction Coefficient Correlation depending on Sample Form and Density Range

| Sample Form | Density (g/cm$^3$) | Self-Absorption Correction Efficient Correlation ($\rho$ = medium density (g/cm$^3$)) | Note |
|---|---|---|---|
| 450 mL Marinelli | <2.0 | y = 1.1958 − 0.1352 $\rho$ | |
| | ≥2.0 | y = 1.17754 − 0.14001 $\rho$ + 0.0066 $\rho^2$ | |
| 20 mL Cylinder | <2.0 | y = 1.1278 − 0.0883 $\rho$ | |
| | ≥2.0 | y = 1.12232 − 0.09274 $\rho$ + 0.00348 $\rho^2$ | |
| 1 mm Filter Paper | <2.0 | y = 1.0171 − 0.0117 $\rho$ | |
| | ≥2.0 | y = 1.02659 − 0.01556 $\rho$ + 0.000431808 $\rho^2$ | |

Slag produced via melting decontamination is mostly a silicon/carbon-based material and becomes brittle and shatters even when receiving a small physical impact, and may be easily measured in an analytic sample vessel such as a Marinelli beaker in order to perform gamma nuclide analysis. However, ingots are manufactured by pouring a hot melt into a mold and then performing rapid cooling, and the resulting solidified ingots are difficult to shape due to the strength properties thereof, making it difficult to form them into the same shape as the analytic sample vessel.

Hence, the surface and inside of the ingot are subjected to milling and drilling to obtain chips, after which the chips are ground thus manufacturing a sample, which is regarded as effective. In accordance with the simulation results using the MCNP computer code, in the low density range of about 1.4 g/cm$^3$ or less upon measurement simulation of the ingot, the number (count number) of gamma rays which change into a pulse in the detector can be seen to increase, compared to the measurement simulation using the certified reference material (CRM). This means that the self-absorption correction coefficient (K) is 1.0 or more in the corresponding density range.

TABLE 4

Linear Absorption Coefficient depending on Density and Medium

| Density | Linear Absorption Coefficient (cm$^{-1}$) per medium | | Note |
|---|---|---|---|
| | H$_2$O (CRM) | Ingot | |
| 1.0 g/cm$^3$ | 0.14031 | 0.15700 | Gamma |
| 1.1 g/cm$^3$ | — | 0.17270 | Energy = |
| 1.2 g/cm$^3$ | — | 0.18840 | 186 keV |
| 1.3 g/cm$^3$ | — | 0.20410 | |
| 1.4 g/cm$^3$ | — | 0.21980 | |

As is apparent from Table 4 showing the linear absorption coefficient depending on the medium in the low density range, the corresponding values are calculated so as to be adapted to the density based on mass absorption coefficient library per nuclide as represented in "Radiological Health Handbook (1970)".

The certified reference material (CRM) is composed mainly of H$_2$O and has a smaller linear absorption coefficient compared to the ingot as shown in Table 4, and thus, effects caused upon passing gamma rays through the medium are lower compared to the ingot.

Taking into consideration only such effects, the case where the medium is the ingot should satisfy conditions in which the number of gamma rays which reach the detector is lower and K (which is the self-absorption correction coefficient) is thus 1.0 or less, compared to the case where the medium is H$_2$O. However, because gamma rays may scatter while passing through the material, gamma rays emitted outside the solid angle in the measurement direction from the ray source may react with the medium and may scatter and come into the detector to thus be measured. In particular because the elastic scattering cross section varies with respect to gamma rays depending on the composition of each medium, such effects become different depending on the composition of the medium. Moreover, the elastic scattering cross section of the ingot in the energy range of 186 keV is much larger than that of H$_2$O, and thus, gamma rays emitted in the direction opposite the detector in the vicinity of the medium close to the detector are more greatly affected by back scattering. In the low density range in which the linear absorption coefficient is comparatively low, the case where the medium is the ingot increases the count number compared to the case where the medium is H$_2$O.

Figure 5:
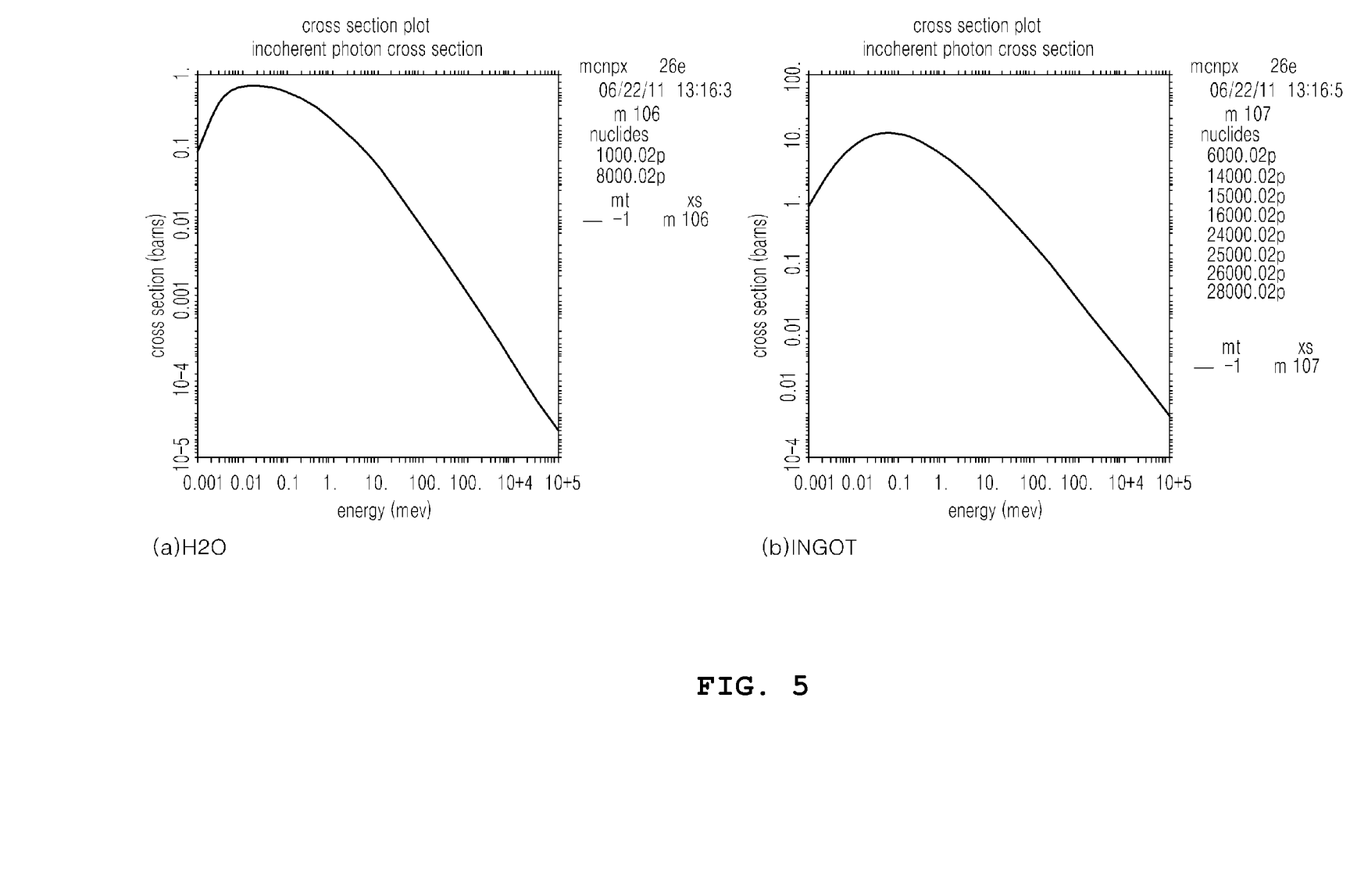
FIGS. 5A and 5B are graphs illustrating an incoherent photon elastic scattering cross section of $H_2O$ and an ingot respectively in an energy range in the process of measuring the radioactive material according to the present invention.
Figure 6:
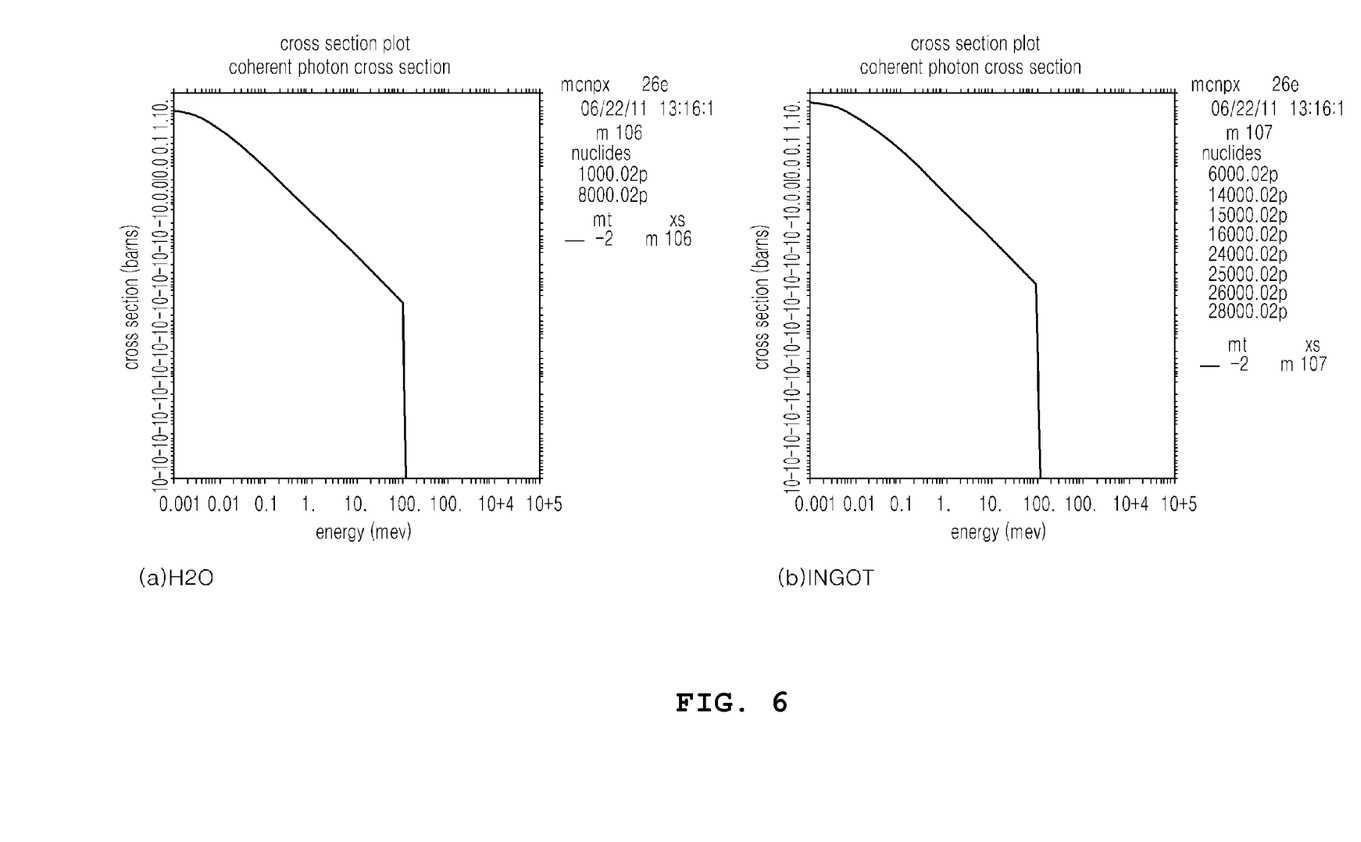
FIGS. 6A and 6B are graphs illustrating a coherent photon elastic scattering cross section of $H_2O$ and an ingot respectively in an energy range in the process of measuring the radioactive material according to the present invention.

FIGS. 5A and 5B and 6A and 6B are graphs illustrating incoherent/coherent photon elastic scattering cross sections of H$_2$O of FIGS. 5A and 6A and of the ingot of FIGS. 5B and 6B in an energy range, in which the elastic cross section near 186 keV is at least 10 times more when the medium is the ingot compared to when the medium is H$_2$O, which means that the probability for the gamma rays emitted in the direction opposite the detector to be back scattered via a reaction with the medium and thus be measured higher by the detector when the medium is the ingot. Accordingly, in the case of a low density medium, detection efficiency may be higher when the medium is the ingot compared to when the medium is H$_2$O.

This phenomenon mainly occurs only near the surface of the sample that almost contacts the detector, and thus is decreased in the case of a high density sample in which attenuation of gamma rays play a leading role in interaction of gamma rays with the material.

Example

A gamma spectrometer used in an example of the invention is a P-type HPGe detector with the model number of GEM-601095-p available from EG&G ORTEC, which has a detection efficiency of 40% and is able to analyze gamma nuclides and determine the nuclides.

Typically, minimum detection activity (MDA) of the detector is in inverse proportion to the effective live time and is proportional to the square root of the background count. To ensure sufficient MDA upon measurement, effects of background radiation should be minimized, and the detection time of a predetermined period of time or longer should be ensured.

A background count rate is maintained at a predetermined level so long as additional shielding is not carried out. Accordingly, as the detection time increases, MDA decreases in proportion to the square root of the detection time. Even when the detection time is increased under the condition of a predetermined level being exceeded, MDA is not greatly decreased, and thus it is important to minimize the effects of background radiation using shielding or the like.

To calculate MDA depending on shielding effects and detection time, the detection value and MDA of the sample ingot were calculated depending on the measurement time. The ingot was demonstrated to be uniform via ICP-MS and had quantified radioactivity.

Figure 7:
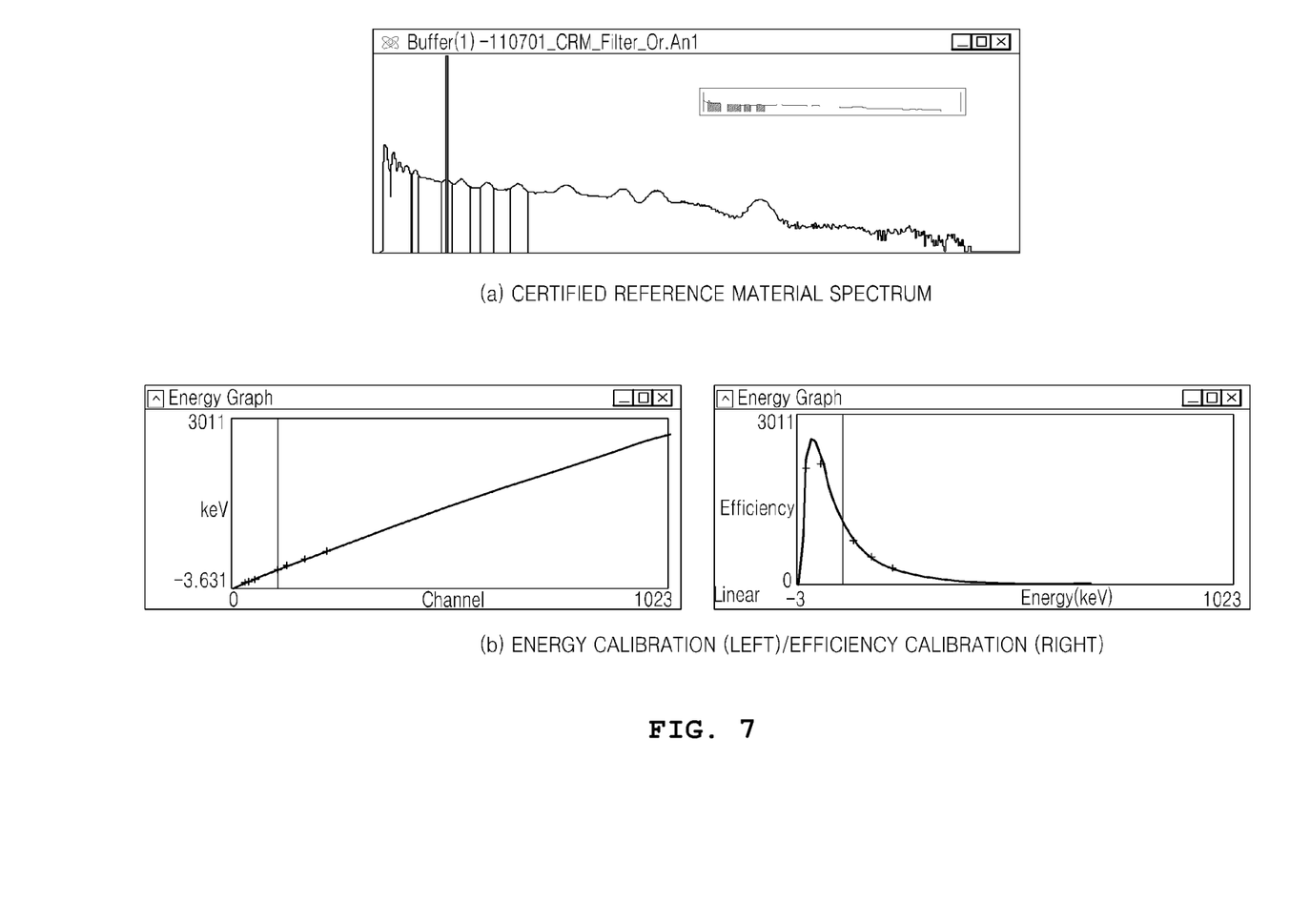
FIGS. 7A and 7B illustrate energy and efficiency calibrations of the HPGe gamma scintillator in the process of measuring the radioactive material according to the present invention.

FIGS. 7A and 7B show energy and efficiency calibrations of the detector using the reference material, in which FIG. 7A shows the spectrum of the certified reference material and FIG. 7B shows the energy calibration and the efficiency calibration at the left and the right, respectively.

When radiation in the ingot is actually measured using a radioactivity detector, radiation reaching the detector is gamma rays generated by most of the ingot as shown in FIG. 7A.

Melt and Ingot Homogeneity

Regarding the melt and ingot homogeneity in the present invention, homogeneity of the ingot produced using melting decontamination has already been revealed by many prior studies. For example, according to M. Aoyama (2005), upon a melting decontamination test of stainless steel contaminated with depleted uranium, the upper, middle and lower portions of the melt were sampled and analyzed using ICP-MS, so that respective concentrations were reported to be similar.

Furthermore in many industrial melting decontamination facilities, radioactivity analysis was performed on the assumption that all of the ingots produced using melting decontamination are uniform. Particularly in the case of Studsvik, only a small amount was sampled from an ingot having 3~5 tons and analyzed. The melting decontamination is advantageous because representativeness of the ingot on a large scale may be acquired by analyzing a small amount of sample.

However, there may exist local radioactivity concentrations depending on operating conditions such as the type of melting furnace and the additives upon melting decontamination. Thus in the present invention, the following melting decontamination tests were conducted two times, and the melt and the ingot/slag were analyzed using ICP-MS, thereby ascertaining the homogeneity of the melt.

Two tests were carried out. The first test was performed by subjecting contaminated metal waste to melting decontamination, thus producing 10 ingots among which three ingots samples were selected, and the upper, middle and lower portions at three different positions of two ingots obtained from the middle and lower parts of the selected ingots, namely, 9 positions per ingot, were sampled and analyzed and compared using ICP-MS, and simultaneously the ingot obtained from the upper part thereof was subjected to gamma nuclide analysis using HPGe, thereby conducting cross analysis to ascertain reliability of the equipment. In particular in the case of slag, the slag was sampled in the early, middle and late stages of melting decontamination depending on the time at which the slag was generated, and respectively analyzed.

The second test was carried out by artificially charging 1 kg of $UO_2$ having an enrichment of 4.65 w/o to non-contaminated metal to evaluate the material balance depending on the melting decontamination, and by sampling each sample from the melt and the upper ingot as in the first test to perform cross analysis using ICP-MS and gamma nuclide analysis to ascertain reliability of the equipment, and also by sampling two of produced ingots at 9 positions per ingot to perform uranium concentration analysis using ICP-MS, thus proving homogeneity in the melt. The generated slag was subjected to both gamma analysis and ICP-MS analysis, thus determining a decontamination coefficient and calculating the material balance.

In the melting decontamination process, 1 kg of $UO_2$ powder was charged into a melting furnace and nuclear fuel power having a comparatively high enrichment of 4.65 w/o was used. The melting decontamination in the melting furnace was carried out for about 3 hr. Because the ingot was separated from the mold in a state of the ingot being sufficiently cooled, this separating was performed the day after melting decontamination.

Figure 8:
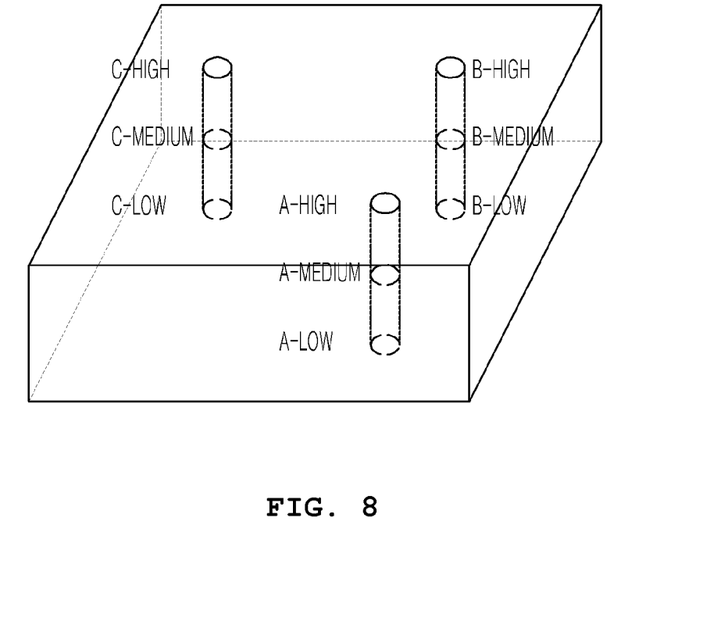
FIG. 8 illustrates the sampling positions inside the ingot in order to demonstrate homogeneity of the ingot subjected to melting decontamination, in the process of measuring the radioactive material according to the present invention.

Sampling was conducted in ingots and slag produced upon first and second tests, according to ASTM-1806. The samples and the measurement method are given in Tables 5 and 6 below, and FIG. 8 shows the sampling positions of the ingot.

TABLE 5

Sampling upon First Melting Decontamination Test

| Type | Sampling Method | Gamma Nuclide Analysis | ICP-MS Analysis | Note |
|---|---|---|---|---|
| #3 Ingot (25.6 kg) | Milling | 1,000 mL sampling | 1 EA sampling | |
| #6 Ingot (39.0 kg) | Drilling | | 3 × 3 EA sampling | |
| #7 Ingot (25.4 kg) | Drilling | | 3 × 3 EA sampling | |
| Slag (—) | — | | 3 EA sampling | |
| Total | | about 1000 mL | 22 EA | |

TABLE 6

Sampling upon Second Melting Decontamination Test

| Type | Sampling Method | Gamma Nuclide Analysis | ICP-MS Analysis | Note |
|---|---|---|---|---|
| #3 Ingot (23.6 kg) | milling | 1,000 mL sampling | 1 EA sampling | |
| #6 Ingot (36.6 kg) | drilling | | 3 × 3 EA sampling | |
| #7 Ingot (22.4 kg) | drilling | | 3 × 3 EA sampling | |
| Melt Sample (6.4 kg) | milling | 1,000 mL sampling | 1 EA sampling | Crucible |
| Slag (—) | — | | 3 EA sampling | |
| Total | | about 2000 mL | 23 EA | |

Analytic Results

The ingots and slag produced upon first and second melting decontamination tests were analyzed using ICP-MS and HPGe, thus obtaining the following results.

TABLE 7

Analysis of Ingots and Slag using Melting Decontamination Tests

| | | ICP-MS (Bq/g) | HPGe (Bq/g) | Note |
|---|---|---|---|---|
| $1^{st}$ | #3 Ingot | 0.0047 | 0.0120 | |
| | #6 Ingot | 0.0047~0.0096 (Avg: 0.0071, STD: 0.00143) | — | |
| | #7 Ingot | 0.0049~0.0078 (Avg: 0.0059, STD: 0.000952) | — | |
| | Slag | 337/13.2/9.02 | 131/14.9/28.7 | Early/Middle/Late |

TABLE 7-continued

Analysis of Ingots and Slag using Melting Decontamination Tests

| | | ICP-MS (Bq/g) | HPGe (Bq/g) | Note |
|---|---|---|---|---|
| $2^{nd}$ | Melt | 0.0250 | 0.02045 | |
| | #3 Ingot | 0.0212 | 0.02813 | |
| | #6 Ingot | 0.0145~0.0209 (Avg: 0.0170, STD: 0.00206) | — | |
| | #7 Ingot | 0.0148~0.0276 (Avg: 0.0187, STD: 0.00372) | — | |
| | Slag | 4,941/86.4/491.8 | 2,903/286.8/932.2 | Early/Middle/Late |

In the first melting test, uranium was not artificially charged, and thus the radioactivity of ingots and slag was low, and also because contaminated metal waste which is difficult to measure was subjected to melting decontamination, the initial contamination concentration could not be determined.

In the second melting test, the initial contamination concentration was $7.3 \times 10^7$ Bq.

The radioactivity in the ingots using ICP-MS was measured to be 0.0047~0.0096 Bq/g in the first test and 0.0145~0.0250 Bq/g in the second test. Although there seems to be a relatively small standard deviation, the corresponding level is very low to the extent of less than 1/10 of the natural level (0.0250 Bq/g is about 0.3 ppm, and the uranium concentration in the natural soil is about 3~5 ppm). Taking into consideration the statistical measurement error occurring therefrom, the above results are evaluated as being good enough to prove homogeneity in the melt upon melting decontamination.

The ingot having the highest measurement value is less than 2% of the clearance limit of 0.497 Bq/g, from which the decontamination level is evaluated to be excellent using melting.

Tables 8 to 13 below show the measurement results per ingot sample.

TABLE 8

Analytic Results of #3 Ingot upon First Melting Decontamination Test (ICP-MS/HPGe)

| | | Activity (Bq/g) | | | |
|---|---|---|---|---|---|
| | Analytic Method | U-235 | U-238 | Total | Note |
| #3 Ingot | ICP-MS | 0.0002 | 0.0010 | $4.70 \times 10^{-3}$ | |
| | HPGe | $4.95 \times 10^{-4}$ | — | $1.20 \times 10^{-2}$ | |

TABLE 9

Analytic Results of #6 Ingot upon First Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0003 | 0.0019 | 0.0073 | |
| 2 | A-Middle | 0.0003 | 0.0018 | 0.0068 | |
| 3 | A-Lower | 0.0002 | 0.0015 | 0.0062 | |
| 4 | B-Upper | 0.0002 | 0.0015 | 0.0079 | |
| 5 | B-Middle | 0.0004 | 0.0022 | 0.0096 | |
| 6 | B-Lower | 0.0003 | 0.0019 | 0.0079 | |
| 7 | C-Upper | 0.0002 | 0.0012 | 0.0047 | |
| 8 | C-Middle | 0.0003 | 0.0018 | 0.0077 | |

TABLE 9-continued

Analytic Results of #6 Ingot upon First Melting Decontamination Test (ICP-MS)

| | | Activity (Bq/g) | | | |
|---|---|---|---|---|---|
| No. | Position | U-235 | U-238 | Total | Note |
| 9 | C-Lower | 0.0002 | 0.0014 | 0.0058 | |
| | Average | — | — | 0.0071 | |
| | Standard Deviation | — | — | 0.00143 | |

TABLE 10

Analytic Results of #7 Ingot upon First Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0002 | 0.0013 | 0.0054 | |
| 2 | A-Middle | 0.0002 | 0.0015 | 0.0061 | |
| 3 | A-Lower | 0.0003 | 0.0019 | 0.0069 | |
| 4 | B-Upper | 0.0002 | 0.0012 | 0.0049 | |
| 5 | B-Middle | 0.0002 | 0.0017 | 0.0056 | |
| 6 | B-Lower | 0.0002 | 0.0013 | 0.0050 | |
| 7 | C-Upper | 0.0002 | 0.0014 | 0.0062 | |
| 8 | C-Middle | 0.0003 | 0.0026 | 0.0078 | |
| 9 | C-Lower | 0.0002 | 0.0013 | 0.0053 | |
| | Average | — | — | 0.005911 | |
| | Standard Deviation | — | — | 0.000952 | |

TABLE 11

Analytic Results of Melt and #3 Ingot upon Second Melting Decontamination Test (ICP-MS/HPGe)

| | | Activity (Bq/g) | | | |
|---|---|---|---|---|---|
| | Analytic Method | U-235 | U-238 | Total | Note |
| #3 Ingot | ICP-MS | 0.0007 | 0.0031 | $2.12 \times 10^{-2}$ | |
| | HPGe | $1.26 \times 10^{-3}$ | — | $2.813 \times 10^{-2}$ | 4.65 w/o |
| Melt Sample | ICP-MS | 0.0011 | 0.0036 | $2.50 \times 10^{-2}$ | |
| | HPGe | $9.18 \times 10^{-4}$ | — | $2.045 \times 10^{-2}$ | 4.65 w/o |

TABLE 12

Analytic Results of #6 Ingot upon Second Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0008 | 0.0025 | 0.0175 | |
| 2 | A-Middle | 0.0008 | 0.0026 | 0.0185 | |
| 3 | A-Lower | 0.0009 | 0.0026 | 0.0185 | |
| 4 | B-Upper | 0.0008 | 0.0022 | 0.0153 | |
| 5 | B-Middle | 0.0008 | 0.0023 | 0.0162 | |
| 6 | B-Lower | 0.0008 | 0.0024 | 0.0167 | |
| 7 | C-Upper | 0.0008 | 0.0030 | 0.0209 | |
| 8 | C-Middle | 0.0007 | 0.0021 | 0.0145 | |
| 9 | C-Lower | 0.0008 | 0.0021 | 0.0150 | |
| | Average | — | — | 0.017011 | |
| | Standard Deviation | — | — | 0.002056 | |

TABLE 13

Analytic Results of #7 Ingot upon Second Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0010 | 0.0026 | 0.0183 | |
| 2 | A-Middle | 0.0009 | 0.0024 | 0.0170 | |
| 3 | A-Lower | 0.0010 | 0.0024 | 0.0171 | |
| 4 | B-Upper | 0.0007 | 0.0027 | 0.0187 | |
| 5 | B-Middle | 0.0007 | 0.0030 | 0.0209 | |
| 6 | B-Lower | 0.0008 | 0.0040 | 0.0276 | |
| 7 | C-Upper | 0.0006 | 0.0025 | 0.0176 | |
| 8 | C-Middle | 0.0005 | 0.0021 | 0.0148 | |
| 9 | C-Lower | 0.0007 | 0.0027 | 0.0166 | |
| Average | | — | | 0.018733 | |
| Standard Deviation | | — | | 0.003716 | |

Analytic Results of Ingots (HPGe Detector)

Tests for analysis of the radioactivity of the ingot were conducted using methods which prove homogeneity of the melt and ascertain the reliability of the measurement equipment. As a result, HPGe and ICP-MS analysis methods were confirmed to be radioactivity measurement methods with very high precision and accuracy. Particularly in order to analyze the radioactivity of the ingot subjected to melting decontamination, the present invention adopts a HPGe spectrometer having gamma detection efficiency comparatively higher than that of a conventional surface contamination meter, and thus has developed a method able to accurately analyze the radioactivity of the ingot.

Also, the development of melting decontamination and measurement methods and the reliability of the measurement equipment were proven by the test results as mentioned above. Metal waste generated during the processing of nuclear fuel for light water reactors was decontaminated using melting decontamination, and then measured using HPGe so as to be self-disposed of. The measurement results are given in Table 14 below.

TABLE 14

Gamma Nuclide Analysis - Clearance Targets

| | | | HPGe (10000 s) | |
|---|---|---|---|---|
| No. | Sample No. | Sample Weight (g) | Measure Result (Bq/g) | MDA (Bq/g) |
| 1 | 0114-3 | 279.7 | 2.195E-02 | 9.162E-03 |
| 2 | 0217-3 | 396.9 | 2.531E-02 | 6.395E-03 |
| 3 | 0218-3 | 487.3 | 3.680E-02 | 7.665E-03 |
| 4 | 0224-3 | 378.2 | 6.469E-02 | 1.505E-02 |
| 5 | 0225-3 | 525.2 | 4.564E-02 | 5.004E-03 |
| 6 | 0318-3 | 347.2 | ≤MDA | 1.013E-02 |
| 7 | 0323-3 | 482.3 | 5.206E-02 | 1.041E-02 |
| 8 | 0325-3 | 505.4 | 2.618E-02 | 7.032E-03 |
| 9 | 0406-3 | 441.8 | 6.800E-02 | 5.940E-03 |
| 10 | 0421-3 | 357.7 | 3.620E-02 | 7.788E-03 |
| 11 | 0506-3 | 401.7 | 2.278E-02 | 6.814E-03 |
| 12 | 0524-3 | 651.7 | 2.041E-02 | 4.459E-03 |
| 13 | 0525-3 | 395.8 | 5.844E-02 | 6.368E-03 |
| 14 | 0623-3 | 465.0 | 5.572E-02 | 1.002E-02 |
| 15 | 0701-3 | 500.2 | 5.334E-02 | 5.500E-03 |
| 16 | 0705-3 | 512.0 | 5.853E-02 | 5.512E-03 |
| 17 | 0712-3 | 656.5 | 3.906E-02 | 4.621E-03 |
| 18 | 0718-3 | 360.6 | 3.402E-02 | 7.504E-03 |

HPGe (measurement for 10,000 s) was carried out in the level of less than 1/10 of 0.497 Bq/g that is the clearance limit for metal waste, and the result value is regarded as sufficient for determining whether the ingot may be self-disposed of. Also the sample having similar radioactivity shows a comparatively uniform MDA.

The measurement of the radioactivity of the ingot using HPGe according to the method of the invention is effective at determining whether clearance of the corresponding ingot is possible.

As described above, the present invention provides a method of measuring the radioactive material of an ingot using a HPGe detector. According to the present invention, an ingot having a volume resulting from melting decontamination of metal waste generated in nuclear fuel processing or production facilities undergoes gamma spectroscopy using a HPGe detector to measure radioactivity of U-235 (185.72 keV, 57.2%) among uranium isotopes, thus rapidly determining the radioactivity of total uranium, whereby whether the ingot resulting from melting decontamination of metal waste is self-disposed of or not can be rapidly and efficiently determined.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for evaluating the disposability of an ingot generated from metal waste derived from a source that is a nuclear fuel processing or production facility comprising:

a. subjecting the metal waste to melting decontamination;

b. forming an ingot therefrom having a volume;

c. ascertaining an enrichment value of U-235 based on the source of the metal waste;

d. performing gamma spectroscopy using a high purity germanium (HPGe) detector to generate a detection value for gamma rays of U-235 (185.72 keV, 57.2%) among uranium isotopes, e. performing detector calibration using a certified reference material (CRM), f. determining a self-absorption correction factor depending on sample form and density of a medium by applying a MCNP® (Monte Carlo N-Particle) computer code that simulates the probability that gamma rays from U-235 decay of the CRM and an ingot sample will reach the detector, g. applying the self-absorption correction factor generated at step f to the detection value for gamma rays of U-235 (185.72 keV, 57.2%) at step d to yield a corrected detection value for gamma rays of U-235, h. determining the mass of U-235 based on specific activity applied to the corrected detection value for U-235 generated at step g, i. calculating total uranium mass based on the mass of U-235 and the abundance ratio among uranium radionuclides U-234, U-235 and U-238, wherein the abundance ratio depends on the enrichment value of U-235;

j. calculating total uranium radioactivity of the ingot from total uranium mass and the following equation:

$$S.A\ (Ci/g) = (0.4 + 0.38 E_{235} + 0.0034 E_{235}^2) \times 10^{-6}$$

wherein S.A is the specific activity of total uranium based on the enrichment value of U-235 ($E_{235}$); and k. if the total uranium radioactivity is below a disposal limit, clearing the ingot for recycling or disposal.

2. The method of claim 1, wherein U-235 has an enrichment value of 0.711 w/o to 5 w/o.

3. The method of claim 1, wherein an effective live time of the ingot using the HPGe detector is from 9,000 to 11,000 sec.

4. The method of claim 1, wherein the ingot has a thickness of 1 to 10 cm.

5. The method of claim 1 wherein the self-absorption correction factor is defined by the formula:

$$K_{ies} = M_{ies}/CRM_{es}$$

where K is the self-absorption correction factor, M is the count number of the ingot sample simulated with MCNP®, CRM is the count number of the certified reference material simulated with MCNP®, e is the energy of gamma rays (185.72 keV), i is the density of the medium (g/cm3), and s is the form of the certified reference material and the ingot sample.

6. The method of claim 5 wherein the self-absorption correction factor correlates with sample form and density as in the following table:

| Sample Form | Density (g/cm3) | Self-absorption Correction Factor Correlation ($\rho$ = medium density) |
|---|---|---|
| 450 mL Marinelli beaker | <2.0 | y = 1.1958 − 0.1352$\rho$ |
|  | ≥2.0 | y = 1.17754 − 0.14001$\rho$ + 0.0066$\rho^2$ |
| 20 mL cylinder | <2.0 | y = 1.1278 − 0.0883$\rho$ |
|  | ≥2.0 | y = 1.12232 − 0.09274$\rho$ + 0.00348$\rho^2$ |
| 1 mm filter paper | <2.0 | y = 1.0171 − 0.0117$\rho$ |
|  | ≥2.0 | y = 1.02659 − 0.01556$\rho$ + 0.000431808$\rho^2$. |

7. The method of claim 1 wherein the abundance ratio is as provided in the table below:

| Nuclide | Abundance Ratio in Natural and Enriched Uranium | | | |
|---|---|---|---|---|
|  | Natural | 2.0 w/o | 3.5 w/o | 4.5 w/o |
| U-234 | 0.00005 | 0.00016 | 0.00030 | 0.00039 |
| U-235 | 0.00711 | 0.02000 | 0.03500 | 0.04500 |
| U-238 | 0.99284 | 0.97984 | 0.96470 | 0.95461. |

* * * * *